United States Patent [19]
Guthans

[11] 3,808,650
[45] May 7, 1974

[54] CABLE LOCKING HOOKS
[75] Inventor: Harold A. Guthans, Mobile, Ala.
[73] Assignee: Guthans Engineering Co., Mobile, Ala.
[22] Filed: Oct. 12, 1971
[21] Appl. No.: 188,094

[52] U.S. Cl. .............................................. 24/230.5
[51] Int. Cl. ..................... A43c 11/08, A44b 13/00
[58] Field of Search ............ 24/230.5 CR, 241 PP, 24/241 CH, 241 P, 69 TT

[56] References Cited
UNITED STATES PATENTS
| | | | |
|---|---|---|---|
| 2,429,433 | 10/1947 | Turner | 24/230.5 CR |
| 2,913,793 | 11/1959 | Tallarico | 24/230.5 S |
| 3,668,746 | 6/1972 | Gower | 24/230.5 CR |
| 1,860,695 | 5/1932 | Stahl et al. | 24/69 TT |
| 632,704 | 9/1899 | Fantroy | 24/241 P |
| 1,007,213 | 10/1911 | Lau | 24/241 P |

FOREIGN PATENTS OR APPLICATIONS
| | | | |
|---|---|---|---|
| 831,203 | 1952 | Germany | 24/69 TT |
| 218,657 | 1910 | Germany | 24/69 TT |
| 42,067 | 1915 | Sweden | 24/69 TT |
| 49,105 | 7/1938 | France | 24/230.5 CR |

Primary Examiner—Paul R. Gilliam
Attorney, Agent, or Firm—Buell, Blenko and Ziesenheim

[57] ABSTRACT
A safety cable hook is provided for receiving a cable loop which hook includes a rigid loop, a hook means rotatable on the loop and having a throat with a substantial radius in the plane of the loop exceeding the minimum bending radius of the cable, and a free end on said hook extending parallel to the rigid loop receiving a lock ring slidable in said rigid loop to prevent removal of said cable.

3 Claims, 2 Drawing Figures

CABLE LOCKING HOOKS

This invention relates to cable locking hooks and particularly to a locking hook for receiving a wire cable loop so as to prevent its damage by too sharp a radius of curvature while at the same time locking it against accidental removal.

It is common practice, particularly in the shipping industry, to tie objects together by means of wire cable or rope under tension using cable with loops at each end. One of the problems in this type of practice, however, is to provide a hook which is capable of both locking the cable in place and yet preventing injury to the cable by causing it to bend too sharply over the hook edge and thus fray or break the strands.

The present invention eliminates these problems by providing a hook member which has a body portion adapted to receive a loop and hold it in a loop of substantial radius and lock member preventing accidental removal of the loop.

In a preferred embodiment of my invention I provide a rigid loop means, hook means rotatable on said rigid loop means, said hook means having a throat portion of substantial radius whose depth substantially equals the diameter of a cable which it is designed to receive and a free end portion elongated over the loop means and a lock ring slidable in the loop means engaging the free end portion to prevent removal of a cable loop therein. Preferably, the hook means is rotatable on the loop means by a link member freely movable in the loop. The radius of the throat portion of the hook is greater than the minimum safe bending radius of the cable it receives.

In the foregoing specification I have described certain objects, advantages and purposes of my invention. Other objects, purposes and advantages will be apparent from a consideration of the following description and the accompanying drawings in which.

Figure 1:
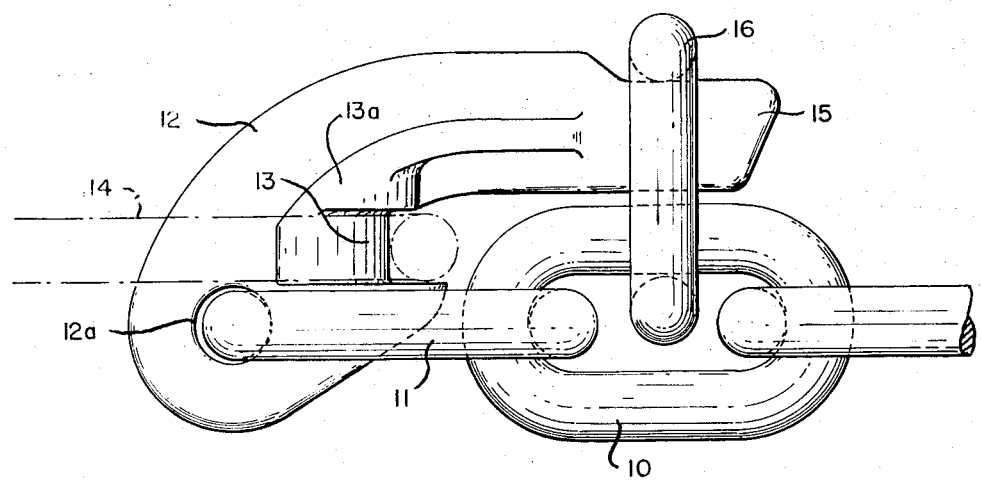
FIG. 1 is a side elevation of a hook according to my invention.
Figure 2:
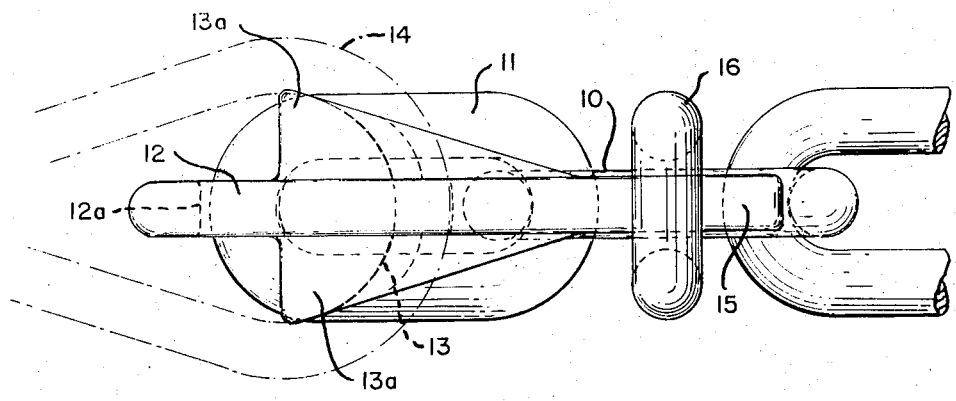
FIG. 2 is a top plane view of the hook of FIG. 1.

Referring to the drawings I have shown a rigid or main loop 10 having a link 11 freely movable therein. A hook 12 is rotatable on link 11 by hold 12a. The hook 12 is provided with an enlarged throat portion 13 formed by sidewardly extending wings or brackets 13a and having a base end which has a radius of curvature in excess of the minimum bending curvature of the wire cable loop 14 which it is intended to engage. The hook 12 also has an elongated free end portion 15, preferably of cylindrical shape which extends parallel to loop 10 and is engaged by lock ring 16 slidable in loop 10 so as to prevent removal of the cable loop from the hook.

In the foregoing specification I have described and illustrated a presently preferred embodiment of my invention, however it will be understood that this invention may be otherwise embodied within the scope of the following claims.

I claim:

1. A safety load binding cable hook comprising a main loop means, hook means rotatably connected to said loop means, said hook means having a throat portion with a base end of generally semi cylindrical shape having a radius in the plane of the throat exceeding the minimum safe bending radius of a cable with which it is used, said throat and base being defined by transverse wing means adapted to retain a cable in the throat on the base, and free end portion elongated over the loop means and receiving a lock ring slidable in the loop means to prevent removal of the cable loop, wherein the hook is connected to the loop by a link freely movable in each.

2. A cable hook as claimed in claim 1 wherein said throat portion has a second radius transverse to the first and substantially equal to the radius of the cable.

3. A cable hook as claimed in claim 1 wherein the free hook end is an elongated cylinder paralleling one side of the loop.

* * * * *